United States Patent [19]
Einsel et al.

[11] 4,130,998
[45] Dec. 26, 1978

[54] ADJUSTABLY TURNABLE SHAFT-GUARD

[75] Inventors: Kenneth D. Einsel; Roland W. Johnson, both of Hastings, Nebr.

[73] Assignee: Hastings Equity Grain Bin Mfg. Co., Hastings, Nebr.

[21] Appl. No.: 745,089

[22] Filed: Nov. 26, 1976

[51] Int. Cl.² ............................................. F16L 1/06
[52] U.S. Cl. ..................................... 64/3; 64/DIG. 1
[58] Field of Search ................... 64/32 R, 3, 4; 74/609

[56] References Cited

U.S. PATENT DOCUMENTS

| | | | |
|---|---|---|---|
| 2,612,763 | 10/1952 | Hansen | 64/3 |
| 3,136,140 | 6/1964 | Atkinson | 64/4 |
| 3,344,618 | 10/1967 | Young | 64/3 |

*Primary Examiner*—Samuel Scott
*Assistant Examiner*—Jerry Anderson
*Attorney, Agent, or Firm*—George R. Nimmer

[57] ABSTRACT

Disclosed are adjustably radially turnable shaft-guards for rotatable shafts and shaft-assemblies which extend from a stationary first-housing to a stationary second-housing. The shaft-guard, which surrounds the shaft or shaft-assembly, has telescopically associated tubes maintained in non-turning condition by yokes attached to said housing whenever the shaft or shaft-assembly is being powered thereby precluding injury to personnel. The telescopically associated tubes are slotted and by virtue of removably secured turning control means the shaft-guard slots can be rotated to align with the lubricatable zerks of the de-powered and stopped shaft or shaft-assembly.

7 Claims, 3 Drawing Figures

ADJUSTABLY TURNABLE SHAFT-GUARD

It is the general objective of the present invention to provide a shaft-guard for protecting personnel from being injured by a rapidly rotating power transmission shaft or shaft-assembly, with the shaft-guard also having the capability for permitting ready access to the co-rotatable lubricatable zerks after the shaft or shaft-assembly has been de-powered and irrespective of the "at rest" position assumed by the zerks relative to the central-axis.

FIG. 1 represents a PRIOR ART environmental situation comprising a typical unprotected shaft-assembly "SA" for which the adjustably radially turnable shaft-guard concept (e.g./"SG") of the present invention might be employed. Power transmission shaft-assembly "SA" extends along a central-axis 9 between a pair of stationary housings "H" such as first-housing "HA" and second-housing "HB". Each housing "H" herein depicted has various frontal contours respectively surrounding central-axis 9 such as contours 81, 82, 83, and 84. Cylindrical shaft 90 along central-axis 9 is herein depicted as three distinct segments with the shorter terminal segments 90A and 90B being journalled at housings "HA" and "HB", respectively. The major shaft length is provided by medial segment 90C. Herein coupling medial shaft segment 90C to the respective shorter segments 90A and 90B are universal joints such as first-joint 95A and second-joint 95B. Extending radially outwardly from joints 95A and 95B, respectively, are lubricatable fittings or "zerks" 96A and 96B. Thus, relative to central-axis 9, lubricatable zerks 96A and 96B extend radially outwardly therefrom, and as herein arbitrarily depicted the zerks are also axially aligned (i.e. lie along a line parallel to central-axis 9). Shaft-assembly "SA" is powerably rotable about (and also de-powerably stoppable) about central-axis 9, as by use of operator controls "CC". As is well known in the prior art, a rapidly powerably rotating shaft (90) or shaft-assembly ("SA") offers potential of serious injury to nearby personnel. Admittedly, shaft-guards which stationarily non-turnably surround the rotating shaft, and hence offer protection to personnel, are well known in the prior art. However, prior art shaft-guards are notably deficient in that they do not permit ready access to the unpredictable "at rest" position for the fittings (96A, 96B) of the stopped shaft, whereby the lubrication task is made very difficult and troublesome.

With the above and other ancillary objects and advantages in view, the adjustably radially turnable shaft-guard of the present invention generally comprises: a first-yoke and a second-yoke non-rotatably mountable to the first-housing and the second-housing, respectively, as by elongated mounting straps; a first-tube radially turnably associated with the first-yoke and a second-tube radially turnably associated with the second-yoke and axially telescopically associated with the first-tube, the associated tubes including window-like slotted portions radially alignable with lubricatable zerks of the shaft-assembly; intertubes co-arresting means to maintain the selected telescoped collective length of the first-tube and second-tube; and removably secured turning control means extending from at least one tube to at least one yoke to permit the tubes to non-turnably surroundingly guard the shaft-assembly length whenever being powered, and to permit the associated tubes to be adjustably radially turnable about the shaft central-axis to the de-powered shaft-assembly whereby the window-like slotted portions are radially alignable with the "at rest" lubricatable zerks.

In the drawing, wherein like characters refer to like parts in the several views, and in which:

FIG. 1, as previously described, is a top plan view of a typical prior art environment comprising a power transmission shaft-assembly for which the adjustably turnable shaft-guard concept of the present invention might be employed.

Figure 1:
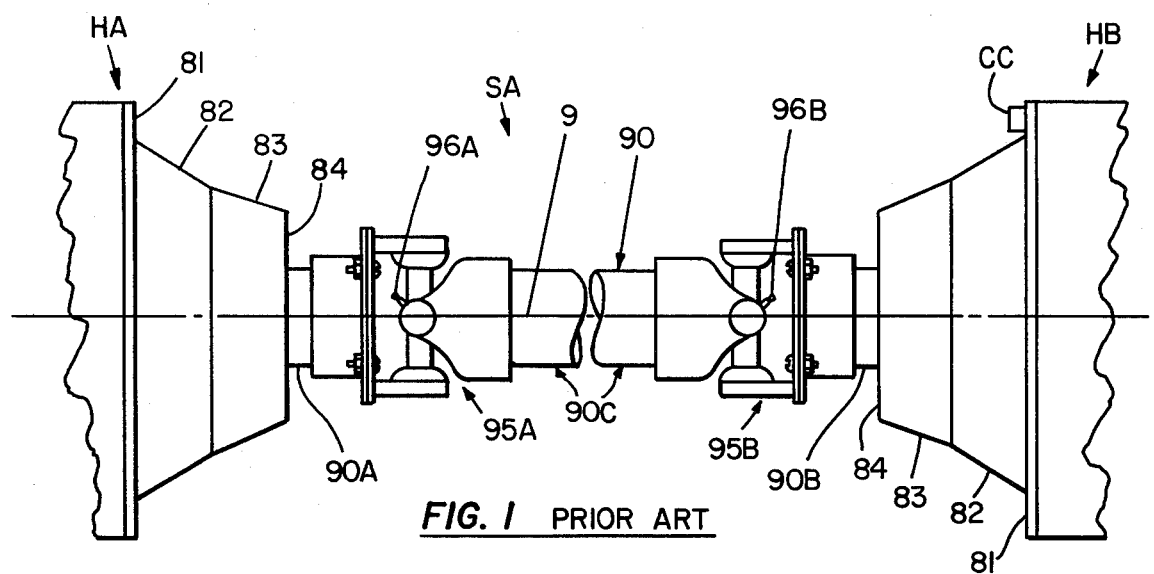
Figure 3:
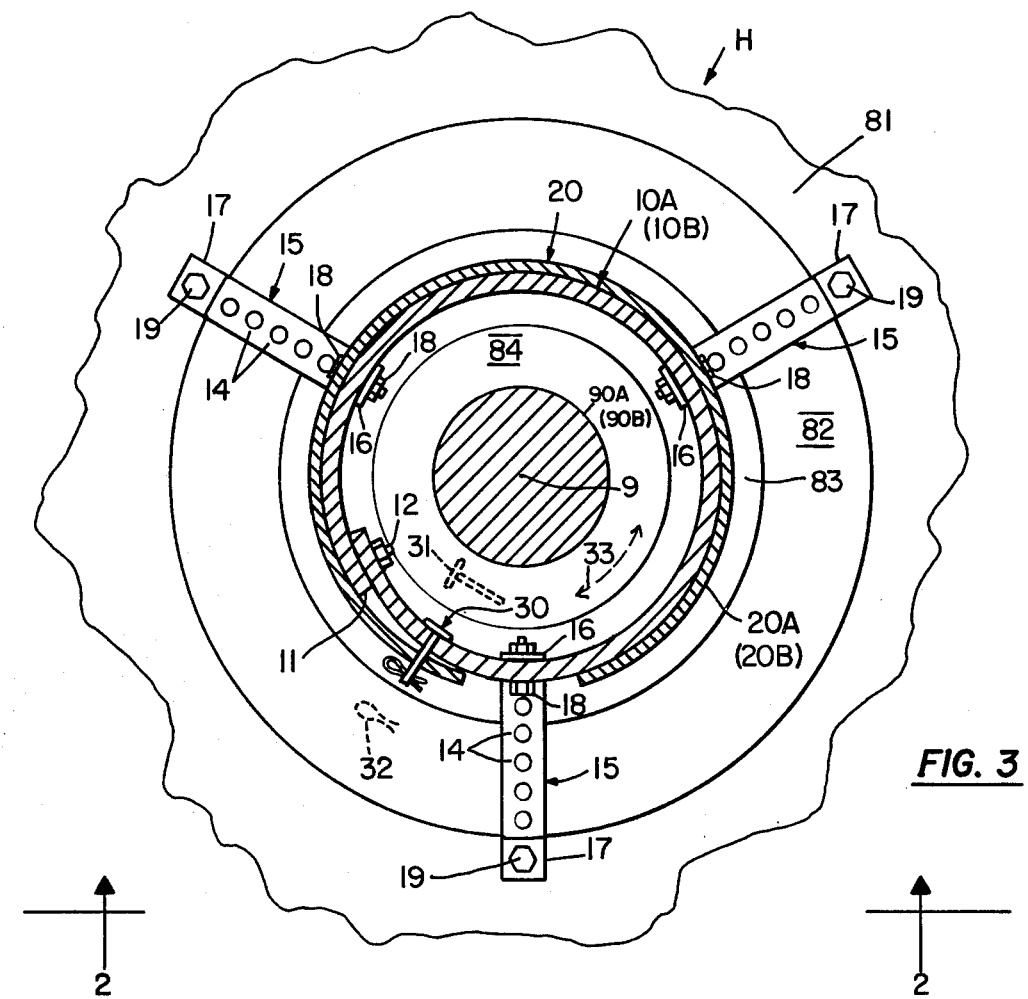
FIG. 3 is a sectional elevational view taken along line 3—3 of FIG. 2, showing the FIG. 2 shaft-guard installed within the FIG. 1 typical environment.

The adjustably radially turnable shaft-guard "SG" generally comprises a pair of longitudinally separated yokes 10 which are non-rotatably mounted to the respective stationary housings "HA" and "HB". The yokes 10 are preferably of collar-like form and which surround central-axis 9 (which is also the longitudinal-axis of shaft-guard "SG"), but are of sufficiently short-length along axis 9 so as to non-obscure the lubricatable zerks 96A and 96B. Herein, first-yoke 10A surrounds shaft segment 90A and is non-rotatably secured to housing "HA" with a plurality of elongated mounting-straps 15 (having holes 14) which are closely conformable to housing contours 81-83. The fore-end 16 of each mounting-strap 15 is disposed interiorly of and attached to first-yoke 10A with threaded fasteners 18, while the rear-end 17 of each mounting-strap is attached to first-housing "HA" contour 81 with threaded bolts 19. Similarly, second-yoke 10B surrounds shaft segment 90B and is non-rotatably secured with mounting-straps 15 ultimately attached with threaded bolts 19 to the second-housing "HB" at 81. As indicated in FIG. 3, there is a plurality of at least three separate elongate mounting straps attached at 18 to each yoke 10, neighboring straps being at an angular spacing, with respect axis 9, not exceeding about 120°. It is very desireable that the shaft-guard "SG" to be installable around central-axis 9 without the necessity for first having to decouple shaft-assembly "SA". In this vein, the respective collar-like yokes 10 are preferably of split-ring configuration, wherein the overlapping exposed end 11 (and fastenable at 12) of both yokes extending in the same angular direction about axis 9.

Providing the preponderant length of shaft-guard "SG" and extending from first-yoke 10A to second-yoke 10B is a pair telescopically associated tubes 20. First-tube 20A is radially turnable about central-axis 9 at first-yoke 10A, while second-tube 20B is similarly radially turnable but at second-yoke 10B. Herein, tubes 20A and 20B surround the first yoke 10A and the second-yoke 10B, respectively. As will be described later in more detail, there are removably securable intertubes co-arresting means (e.g. 25-29) to maintain the selected length of the tubes 20, which also maintains the said tubes 20 fixed together in angular direction about axis 9.

Figure 2:
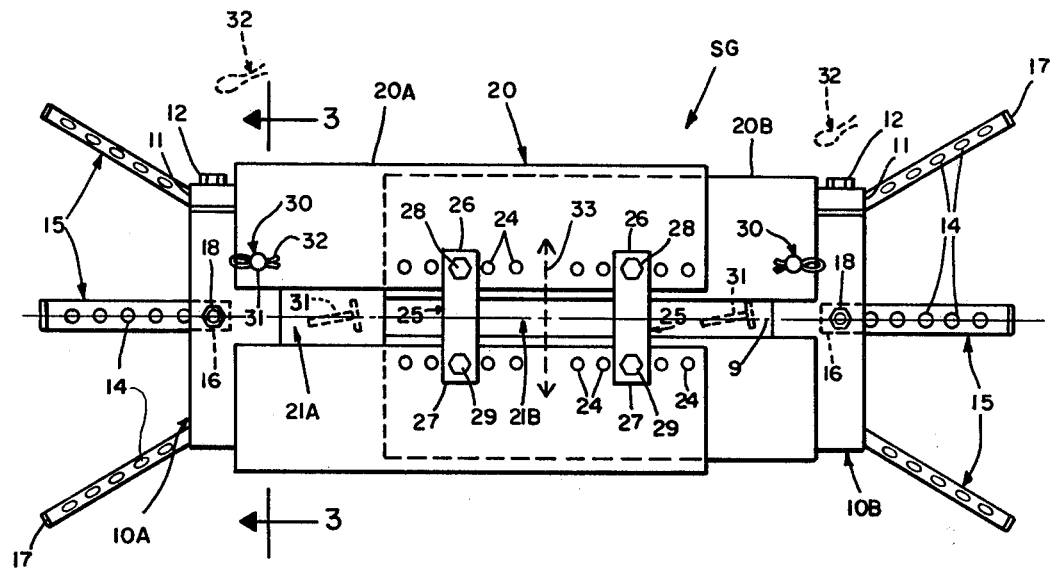
FIG. 2 is a bottom plan view of a representative embodiment of the adjustably radially turnable shaft-guard of the present invention.

There are removably securable turning control means (30) extending from at least one of the co-arrested tubes 20 to at least one of the stationary yokes 10 to permit the tubes to remain non-turnable about central-axis 9 whenever the shaft-assembly "SA" is rotatably powered. However, upon temporary removal of the turning control means 30, the co-arrested tubes 20 can be manually turned about central-axis 9 as indicated by the phantom-line double-headed arrows 33, said temporary removal (30) and consequent turnability (33) being indicated in phantom line in FIGS. 2 and 3. Herein shown for removably securable turning control means 30 is headed pin 31 (having a removably engaged cotterpin 32) which pin 31 passes through first-yoke 10A and tube 20A. Another turning control means 30 is provided at second-yoke 10B and second-tube 20B.

The associated tubes-pair 20 include longitudinally slotted portions e.g. 21A, 21B. Thus, whenever the shaft-assembly "SA" is de-powered and ceases to rotate about central-axis 9, and upon temporary removal of turning control means 30, the slots (21A, 21B) of the adjustably turnable (33) tubes 20 are radially alignable with the "at rest" position of the shaft-assembly lubricatable zerks 96A and 96B. As previously mentioned, it is very desireable that the shaft-guard "SG" be installable around central-axis 9 without the necessity for first having to decouple shaft-assembly "SA". Accordingly, the first-slot 21A and second-slot 21B preferably extend along the entire longitudinal length of tubes 20A and 20B, respectively. For such cross-sectionally C-shaped tubes 20A and 20B, herein shown for the intertubes co-arresting means is the combination of:

first, a plurality of regularly incrementally spaced holes 24 through the respective tubes 20 and closely parallel along both lineal longitudinal edges of slots 21, second, providing longitudinal alignment condition of slots 21A and 21B, and registering of selected holes 24, third, one or more bridger members 25 spanning the aligned slots 21A and 21B, and fourth, one fastener 28 passing through the bridger 25 first-end 26 and selected registering holes 24 on one side of slot 21, and another fastener 29 passing through the bridger 25 second-end 27 and selected registering holes 24 on another side of slots 21.

Means are provided preventing the co-arrested tubes 20 from actually contacting the respective housings "H". Herein, the fasteners 18 which join the mounting-straps' fore-ends 16 to yokes 10 extend sufficiently radially outwardly of yokes 10 to provide such stop-means for tubes 20.

Operation for the adjustably radially turnable shaft-guard "SG" can be summarized as follows. Whenever the shaft-assembly "SA" is being powerably rotated about central-axis 9 shaft-guard "SG" is held non-turning about axis 9 by virtue of securing means 30 passing through co-arrested tubes 20 and one or more yokes 10. Inasmuch as shaft-guard "SG" extends between housings "H" and surrounds shaft-assembly "SA", personnel are protected thereby from the dangers of rotating shaft-assembly "SA". Whenever the operator desires to lubricate the shaft-assembly zerks 96A and 96B, shaft-assembly "SA" is de-powered (e.g. by "CC") whereby the zerks 96A and 96B come to rest at an unpredictable angular relationship to axis 9, and very probably obscured by tubes 20A and 20B. Next, the operator removes the turning control means (30) members 31 and 32, whereupon tubes 20 can be manually adjustably turned about yokes 10 and central-axis 9 as indicated by double-headed arrows 33. The operator continues to manually adjustably turn tubes 20 until the zerks (e.g. 96A, 96B) can be visually sighted through the windows (e.g. 21A, 21B) whereupon the zerks can be lubricated therethrough. Upon completion of the lubrication task, the operator re-turns 20, and the securing means 30 is re-inserted through the one or both yokes 10 whereupon tubes 20 resume a non-turning relationship about the yokes and central-axis 9. Then, the shaft-assembly "SA" is once again powerably rotated for an extended time period during which time the shaft-guard "SG" once again offers surrounding non-turning protection of shaft-assembly "SA" to nearby personnel.

From the foregoing, the construction and operation of the adjustably turnable shaft-guard will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

We claim:

1. An adjustably radially turnable shaft-guard in combination with a de-powered but rotatably powerable elongate shaft-assembly extending lengthily along a longitudinal central-axis from a stationary first-housing to a stationary second-housing, said shaft-assembly being provided with a plurality of co-rotatable lubricatable zerks, said radially turnable shaft-guard extending along a longitudinal-axis which is superimposed upon said central-axis and is held non-turning whenever the shaft-assembly is in rotatably powered running condition, said shaft-guard permitting zerk lubrication when the shaft-assembly is de-powered and comprising:

A. a first-yoke and a second-yoke, said first-yoke being non-rotably mounted to the first-housing and said second-yoke being non-rotably mounted to the second-housing, the first-yoke and the second-yoke respectively surrounding the central-axis as collars of sufficiently short length to non-obscure the lubricatable zerks;

B. a first-tube turnably associated with the first-yoke and having a longitudinally extending window-like first-slot that is radially alignable with a first-zerk of the shaft-assembly, said first-tube being of substantially C-shaped cross-section by virtue of a longitudinally co-extensive first-slot;

C. a second-tube turnably associated with the second-yoke and being of substantially C-shaped cross-section by virtue of a longitudinally co-extensive second-slot that is radially alignable with a second-zerk of the shaft-assembly, said second-tube being telescopically associated with the first-tube along the longitudinal-axis to allow the shaft-guard to be made substantially co-extensive with the rotatable shaft-assembly length from first-housing to second-housing;

D. removably securable intertubes co-arresting means to maintain the selected telescoped collective length of first-tube and second-tube and to also maintain said tubes in co-turnable relationship, said co-arresting means comprising;
   i. longitudinal alignment of first-slot and second-slot,
   ii. a plurality of longitudinally spaced registrable holes for the first-tube and the second-tube along both edges of first-slot and second-slot thereof,
   iii. at least one bridger spanning the said two longitudinally aligned tube slots, and
   iv. removable fasteners passing through registering holes of both said tubes and said bridger member; and E. removably securable turning control means extending from at least one of the co-arrested tubes to at least one of the stationary yokes to permit the tubes to remain stationarily non-turnable whenever the shaft-assembly is in rotatably powered running condition, and which also permits the aligned first-slot and second-slot to be adjustably radially alignable with the shaft-assembly lubricatable zerks at its de-powered stopped condition.

2. The adjustably turnable shaft-guard of claim 1 wherein the respective yokes are of split-ring configuration whereby the yokes and said C-shaped tubes portions of the shaft-guard can be readily installed without necessity for preliminary decoupling of the shaft-assembly from the housings.

3. The radially turnable shaft-guard of claim 2 wherein the split-ring collar-like yokes have their exposed overlapping end extending in the same angular direction about the longitudinal-axis; wherein the removably securable turning control means comprises removably securable pins extending from first-tube through first-yoke and from second-tube through second-yoke, respectively; and wherein there are stop-means to limit the longitudinal movements of the co-arrested tubes toward the first-housing and second-housing, respectively.

4. The radially turnable shaft-guard of claim 3 wherein each of the respective collar-like yokes are attached to the respective stationary housings with a plurality elongate mounting-straps.

5. An adjustably radially turnable shaft-guard in combination with a de-powered but rotatably powerable elongate shaft-assembly extending lengthily along a longitudinal central-axis from a stationary first-housing to a stationary-second-housing, said shaft-assembly being provided with a plurality of co-rotatable lubricatable zerks, said radially turnable shaft-guard extending along a longitudinal-axis which is superimposed upon said central-axis and is held non-turning whenever the shaft-assembly is in rotatably powered running condition, said shaft-guard permitting zerk lubrication when the shaft-assembly is de-powered and comprising:

A. a first-yoke and a second-yoke respectively surrounding the central-axis as collars of sufficiently short length to non-obscure the lubricatable zerks, each of said yokes being attached to the respective stationary housings with a plurality of at least three elongated multiperforate flexible mounting straps which conform to the housing contour;

B. a first-tube turnably associated with the first-yoke and having a longitudinally extending window-like first-slot that is radially alignable with a first-zerk of the shaft-assembly;

C. a second-tube turnably associated with the second-yoke and having a longitudinally extending window-like second-slot that is radially alignable with a second-zerk of the shaft-assembly, said second-tube being telescopically associated with the first-tube along the longitudinal-axis to allow the shaft-guard to be made substantially co-extensive with the rotatable shaft-assembly length from first-housing to second-housing;

D. removably securable intertubes co-arresting means to maintain the delected telescoped collective length of first-tube and second-tube and to also maintain said tubes in co-turnable relationship; and E. removably securable turning control means extending from at least one of the co-arrested tubes to at least one of the stationary yokes to permit the tubes to remain stationarily non-turnable whenever the shaft-assembly is in rotatably powered running condition, which also permits the window-like tube slots to be adjustably radially alignable with the shaft-assembly lubricatable zerks at its de-powered stopped condition.

6. The radially turnable shaft-guard of claim 5 wherein for said plurality of elongate mounting straps, neighboring straps are at an angular spacing, with respect the shaft-guard longitudinal-axis, not exceeding about 120°; and wherein the removably securable turning control means comprises at least one removably securable pin extending through at least one of the co-arrested tubes and through its immediately neighboring collar-like yoke.

7. The radially turnable shaft-guard of claim 6 wherein the first-tube and second-tube are of substantially C-shaped cross-section by virtue of a longitudinally coextensive first-slot and second-slot, respectively; wherein the removably securable intertubes co-arresting means comprises; longitudinal alignment of the first-slot and the second-slot, a plurality of longitudinally spaced registrable holes for the first-tube and for the second-tube along both edges of the respective tube slots, a pair of longitudinally separated bridgers each spanning the radially aligned tube slots, and removable fasteners passing through registering holes of both tubes and the bridger; wherein there are stop-means at each yoke to limit the longitudinal movement of the co-arrested tubes toward the first-housing and second-housing, respectively; and wherein there are two removably securable pins at both yokes as the turning control means.

* * * * *